United States Patent
Park et al.

(10) Patent No.: US 11,535,301 B2
(45) Date of Patent: Dec. 27, 2022

(54) VEHICLE BODY REAR PORTION HAVING TAILGATE OPENING PORTION

(71) Applicants: HYUNDAI MOTOR COMPANY, Seoul (KR); KIA CORPORATION, Seoul (KR)

(72) Inventors: Hyung Gyu Park, Anyang-si (KR); Sun Hyung Cho, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/502,524

(22) Filed: Oct. 15, 2021

(65) Prior Publication Data
US 2022/0242488 A1    Aug. 4, 2022

(30) Foreign Application Priority Data
Feb. 2, 2021    (KR) ........................ 10-2021-0014434

(51) Int. Cl.
| | | |
|---|---|---|
| B62D 25/08 | (2006.01) | |
| B62D 27/02 | (2006.01) | |
| B62D 21/15 | (2006.01) | |
| B62D 25/02 | (2006.01) | |
| B62D 25/06 | (2006.01) | |

(52) U.S. Cl.
CPC .......... B62D 25/08 (2013.01); B62D 21/152 (2013.01); B62D 25/02 (2013.01); B62D 25/087 (2013.01); B62D 27/023 (2013.01); B62D 25/06 (2013.01)

(58) Field of Classification Search
CPC .... B62D 25/08; B62D 25/087; B62D 27/023; B62D 21/152
USPC ...................... 296/203.01, 4, 193.08, 29, 30
See application file for complete search history.

(56) References Cited

U.S. PATENT DOCUMENTS

| | | | |
|---|---|---|---|
| 11,358,649 B2 * | 6/2022 | Goto ...................... | B62D 27/02 |
| 11,364,954 B2 * | 6/2022 | Kiyoshita .............. | B62D 25/02 |

FOREIGN PATENT DOCUMENTS

JP    3691422 B2 *    9/2005

* cited by examiner

*Primary Examiner* — Dennis H Pedder
(74) *Attorney, Agent, or Firm* — Morgan, Lewis & Bockius LLP

(57) ABSTRACT

A vehicle body rear portion may have a tailgate opening portion for improving torsional rigidity and durability performance of a vehicle body.

17 Claims, 11 Drawing Sheets

VEHICLE BODY REAR PORTION HAVING TAILGATE OPENING PORTION

CROSS-REFERENCE TO RELATED APPLICATION

The present application claims priority to Korean Patent Application No. 10-2021-0014434 filed on Feb. 2, 2021, the entire contents of which is incorporated herein for all purposes by this reference.

BACKGROUND OF THE INVENTION

Field of the Invention

The present invention relates to a vehicle body rear portion having a tailgate opening portion, and more particularly, to a vehicle body rear portion having a structure for improving torsional rigidity and durability performance of a vehicle body.

Description of Related art

A vehicle body to which a tailgate is applied has a quarter portion with a structure capable of mounting and accommodating a rear lamp.

As shown in FIG. 14, and FIG. 15, a vehicle body quarter portion of a conventional tailgate vehicle is disposed above a rear wheel and on a side portion of a tailgate opening portion 101 and includes a lamp housing panel 103 on which a rear lamp 102 is mounted.

As shown in FIG. 15 and FIG. 16, in the conventional tailgate vehicle, a quarter reinforce 104 is applied toward a wheel housing panel 105 in a vertical direction to secure rigidity of the vehicle body quarter portion, and the lamp housing panel 103 of a side external panel 107 is welded and coupled to a quarter internal panel 108, reinforcing the rigidity of the vehicle body quarter portion.

As shown in FIG. 17, when the rear lamp 102 is not mounted on the tailgate vehicle, instead of omitting the lamp housing panel 103 which is formed to be concave to mount the rear lamp 102 in the vehicle body quarter portion, in consideration of a vehicle body design, an extension panel 109 is applied which is not welded and coupled to the quarter internal panel 108 and forms an empty space between the quarter internal panel 108 and the extension panel 109.

However, as described above, when the lamp housing panel 103 is omitted, a welding connection between the quarter internal panel 108 and the extension panel 109 is impossible. Therefore, there occurs a problem in that the rigidity of the vehicle body quarter portion is degraded, and durability of the vehicle body and noise, a vibration, harshness (NVH) performance are degraded.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle body rear portion with a structure which includes a vehicle body quarter portion and allows rigidity and durability of a vehicle body around a tailgate opening portion to be increased.

Objectives of the present invention are not limited to the above-described objectives, and other objectives of the present invention, which are not mentioned, can be understood by the following description and also will be apparently understood through embodiments of the present invention. Furthermore, the objectives of the present invention can be implemented by means described in the appended claims and a combination thereof.

In various exemplary embodiments of the present invention, various aspects of the present invention provide a vehicle body rear portion including a vehicle body rear panel provided with a tailgate opening portion, and a plurality of reinforces coupled to the vehicle body rear panel and disposed in an annular shape in a circumferential direction of the tailgate opening portion, wherein the plurality of reinforces is connected to each other so that end portions of two neighboring reinforces among the plurality of reinforces is stacked and connected to each other, and an end portion of either of the two neighboring reinforces so connected is provided with a partition wall which extends toward the vehicle body rear panel and is coupled to the vehicle body rear panel.

The vehicle body rear panel may include a right quarter internal panel disposed on a right side of the tailgate opening portion, each of the plurality of reinforces may include a right quarter reinforce and a right upper reinforce which are coupled to the right quarter internal panel, and an end portion of the right quarter reinforce and an end portion of the right upper reinforce may be connected to each other in a stacked form.

Furthermore, an end portion of a lower side of the right upper reinforce may be bonded to the right quarter internal panel in a state of being disposed on an external side of an end portion of an upper side of the right quarter reinforce.

Furthermore, the right quarter reinforce may include a base wall spaced from the right quarter internal panel, a front wall formed to be curved on a front end portion of the base wall to face the right quarter internal panel, a rear wall formed to be curved on a rear end portion of the base wall to face the right quarter internal panel, and a quarter partition wall formed to be curved on an upper end portion of the base wall to face the right quarter internal panel.

Furthermore, an end portion of an upper side of the base wall may be in contact with an internal surface of the end portion of the lower side of the right upper reinforce.

Furthermore, the quarter partition wall may be disposed from an internal surface of the right upper reinforce to an external surface of the right quarter internal panel.

Furthermore, the right quarter reinforce may include a quarter front flange formed to extend from an end portion of the front wall and bonded to the right quarter internal panel, a quarter rear flange formed to extend from an end portion of the rear wall and bonded to the right quarter internal panel, and a quarter upper flange formed to extend from an end portion of the quarter partition wall and bonded to the right quarter internal panel.

Furthermore, a right front reinforce may be further bonded to the right quarter internal panel, and an end portion of an upper side of the right front reinforce may be stacked on and bonded to the right quarter reinforce.

Furthermore, the right front reinforce may extend downward to a front side of the right quarter reinforce, and an end portion of a lower side of the right front reinforce may be disposed to be spaced a predetermined interval from an end portion of a lower side of the right quarter reinforce in a front and rear direction thereof.

Furthermore, the end portion of the lower side of the right front reinforce may be disposed to extend to a front side of a wheel housing panel provided in a lower portion of the right quarter internal panel.

Furthermore, a passing hole passing through a portion of the right upper reinforce to allow the quarter upper flange to be bonded to the right quarter internal panel through the passing hole may be formed in the right upper reinforce.

Furthermore, the vehicle body rear panel may include a left quarter internal panel disposed on a left side of the tailgate opening portion, each of the plurality of reinforce may include a left quarter reinforce and a left upper reinforce which are coupled to the left quarter internal panel, and an end portion of the left quarter reinforce and an end portion of the left upper reinforce may be connected to each other in a stacked form.

Furthermore, the vehicle body rear panel may further include an upper rear panel surrounding an upper portion of the tailgate opening portion and connecting an end portion of an upper side of the right quarter internal panel to an end portion of an upper side of the left quarter internal panel, and a lower rear panel surrounding a lower portion of the tailgate opening portion and connecting an end portion of a lower side of the right quarter internal panel to an end portion of a lower side of the left quarter internal panel, and each of the plurality of reinforces may include a first reinforce coupled to the upper rear panel, and a second reinforce coupled to the lower rear panel.

Furthermore, the left quarter reinforce may be configured to be bilaterally symmetrical with respect to the right quarter reinforce based on the first reinforce and the second reinforce.

Furthermore, the left vehicle body quarter portion may be configured to be bilaterally symmetrical with respect to a right vehicle body quarter portion based on the first reinforce and the second reinforce. The right vehicle body quarter portion may include the right quarter internal panel, and the right quarter reinforce and the right upper reinforce which are coupled to the right quarter internal panel. The left vehicle body quarter portion may include the left quarter internal panel, and the left quarter reinforce and the left upper reinforce which are coupled to the left quarter internal panel.

Furthermore, an end portion of a right side of the first reinforce may be connected to an end portion of an upper side of the right upper reinforce in a stacked form, and an end portion of a left side of the first reinforce may be connected to an end portion of an upper side of the left upper reinforce in a stacked form.

Furthermore, an end portion of a right side of the second reinforce may be connected to an end portion of a lower side of a third right reinforce in a stacked form, an end portion of a left side of the second reinforce may be connected to an end portion of a lower side of a third left reinforce in a stacked form, an end portion of an upper side of the third right reinforce may be connected to the end portion of the lower side of the right quarter reinforce in a stacked form, and an end portion of an upper side of the third left reinforce may be connected to an end portion of a lower side of the left quarter reinforce in a stacked form.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
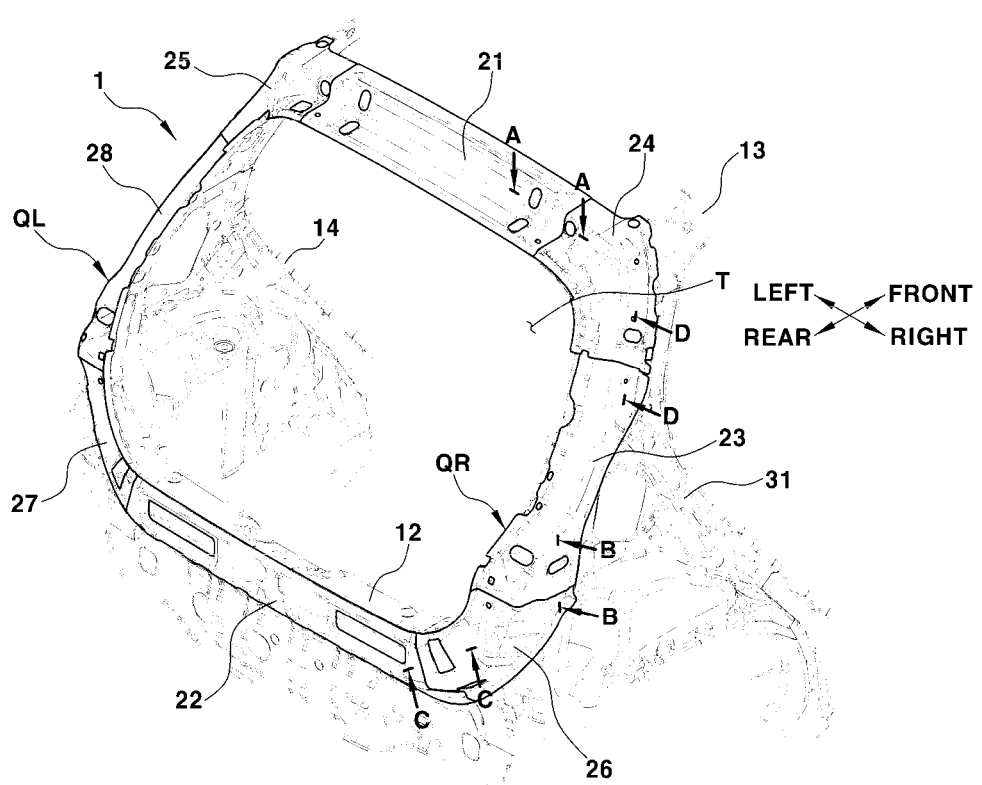
FIG. 1 is a diagram illustrating a vehicle body rear portion according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. Items shown in the drawings are schematically illustrated to easily describe the exemplary embodiments of the present invention, and thus the items may be different from those actually implemented.

Throughout the present specification, when an element is referred to as "comprising" a component, it means that the element can further include other components, not excluding the other components unless stated otherwise.

Here, vertical, lateral, and front and rear directions are based on a vehicle unless otherwise specified. Furthermore, an external side and an internal side are based on a vehicle body unless otherwise specified.

The present invention relates to a vehicle body rear portion formed in a structure which increases torsional rigidity and durability performance. When the vehicle body rear portion according to various exemplary embodiments of the present invention is employed, it is possible to increase vehicle body rigidity of a general vehicle to which a tailgate is not applied as well as, even when a lamp housing panel is omitted from a vehicle body quarter portion of a vehicle to which a tailgate is applied (i.e., a tailgate vehicle), vehicle body rigidity is increased so that it is possible to secure rigidity and durability performance at the same level or more before the lamp housing panel is omitted.

The vehicle body rear portion according to various exemplary embodiments of the present invention is a panel which is disposed on a circumference of a tailgate opening portion provided on a rear portion of the vehicle body. The vehicle body rear portion includes the vehicle body quarter portion, and the vehicle body quarter portion is disposed on each of a left side and a right side of the tailgate opening portion.

The vehicle body quarter portion disposed on the left side of the tailgate opening portion (i.e., a left vehicle body quarter portion) and the vehicle body quarter portion disposed on the right side of the tailgate opening portion (i.e., a right vehicle body quarter portion) may be formed in the same structure. Alternatively, the left vehicle body quarter portion and the right vehicle body quarter portion may be formed in a symmetrical structure.

Figure 2:
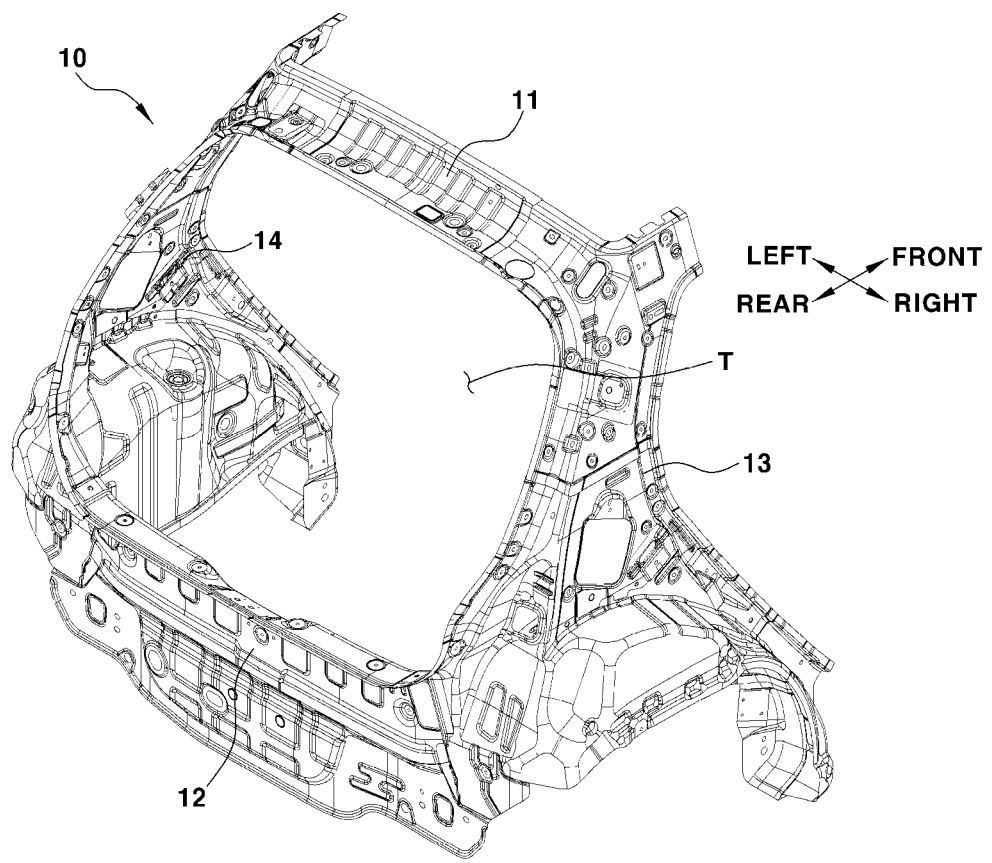
FIG. 2 is a diagram illustrating a vehicle body rear panel in a state in which a reinforce is omitted from the vehicle body rear portion according to various exemplary embodiments of the present invention.
Figure 3:
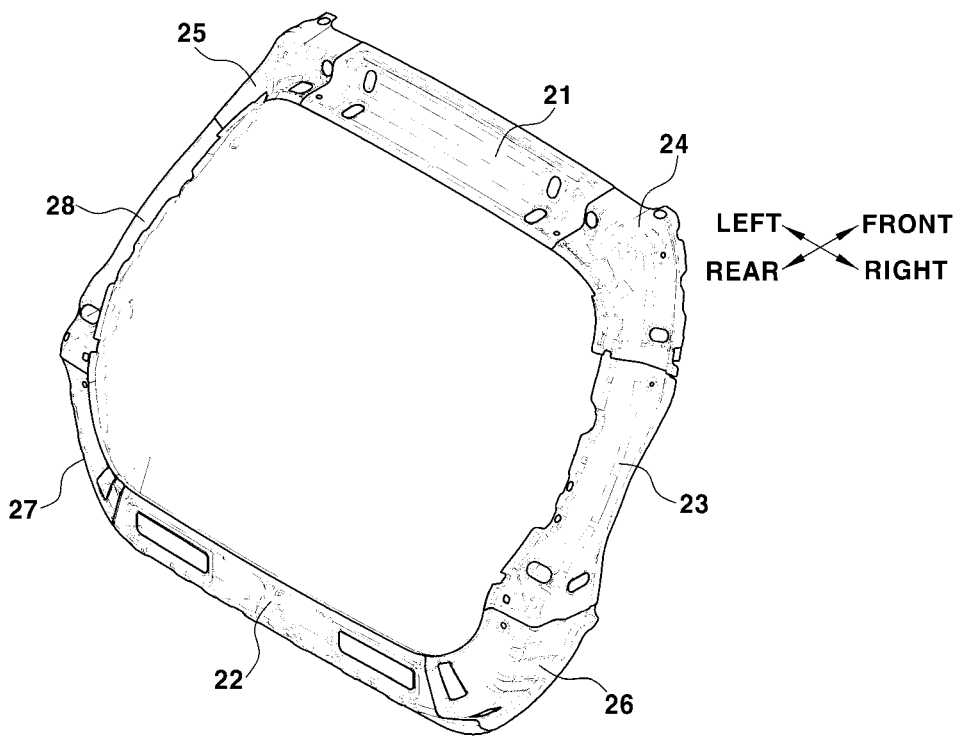
FIG. 3 is a diagram illustrating only reinforces disposed in an annular shape in the rear portion of the vehicle body of the present invention.
Figure 4A:
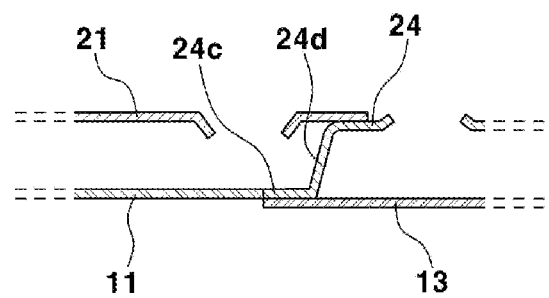
FIG. 4A is a diagram taken along line A-A of FIG. 1 that illustrates a connection portion between a right upper reinforce and a first reinforce according to various exemplary embodiments of the present invention.
Figure 5A:
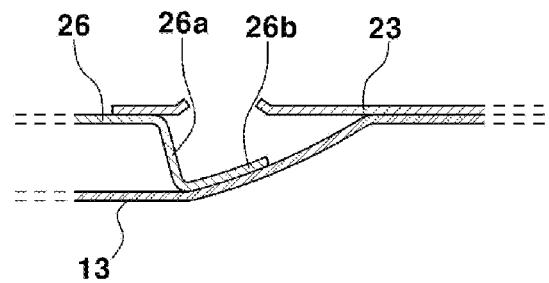
FIG. 5A is a diagram taken along line B-B of FIG. 1 that illustrates a connection portion between a right quarter reinforce and a third right reinforce according to various exemplary embodiments of the present invention.
Figure 6A:
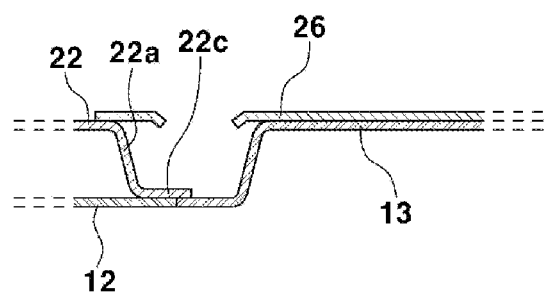
FIG. 6A is a diagram taken along line C-C of FIG. 1 that illustrates a connection portion between the third right reinforce and a second reinforce according to various exemplary embodiments of the present invention.

FIG. 1 is a diagram illustrating a vehicle body rear portion according to various exemplary embodiments of the present invention, FIG. 2 is a diagram illustrating a vehicle body rear panel in a state in which a reinforce is omitted from the vehicle body rear portion according to various exemplary embodiments of the present invention, FIG. 3 is a diagram illustrating only reinforces disposed in an annular shape in the rear portion of the vehicle body of the present invention, FIG. 4A is a diagram taken along line A-A of FIG. 1, FIG. 5A is a diagram taken along line B-B of FIG. 1, and FIG. 6A is a diagram taken along line C-C of FIG. 1.

Figure 4B:
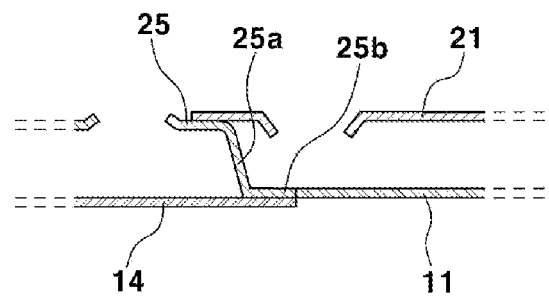
FIG. 4B is a diagram illustrating a connection portion between a left upper reinforce and the first reinforce according to various exemplary embodiments of the present invention.
Figure 5B:
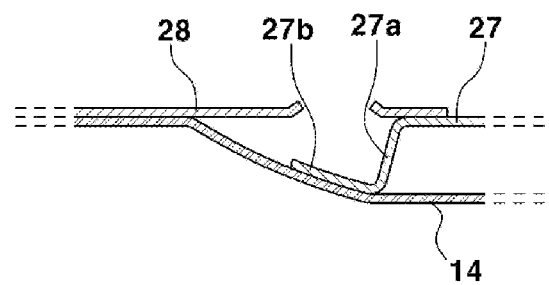
FIG. 5B is a diagram illustrating a connection portion between a left quarter reinforce and a third left reinforce according to various exemplary embodiments of the present invention.
Figure 6B:
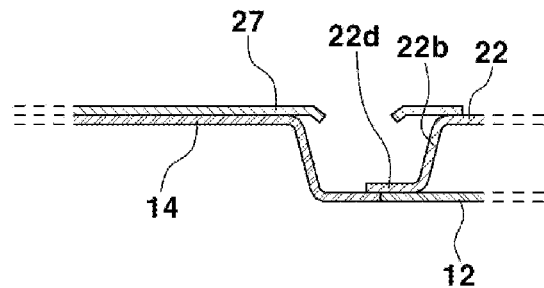
FIG. 6B is a diagram illustrating a connection portion between the third left reinforce and the second reinforce according to various exemplary embodiments of the present invention.

Furthermore, FIG. 4B is a diagram illustrating a connection portion between a left upper reinforce and the first reinforce according to various exemplary embodiments of the present invention, FIG. 5B is a diagram illustrating a connection portion between a left quarter reinforce and a third left reinforce according to various exemplary embodiments of the present invention, and FIG. 6B is a diagram illustrating a connection portion between the third left reinforce and the second reinforce according to various exemplary embodiments of the present invention.

Figure 7:
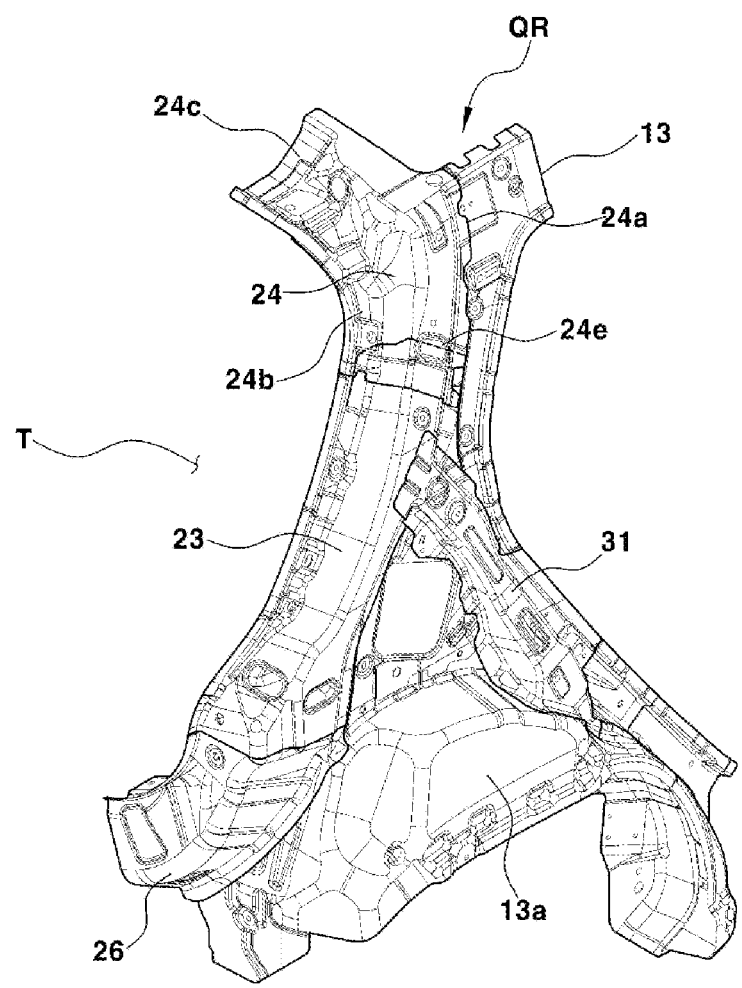
FIG. 7 is a diagram illustrating a right vehicle body quarter portion according to various exemplary embodiments of the present invention.
Figure 8:
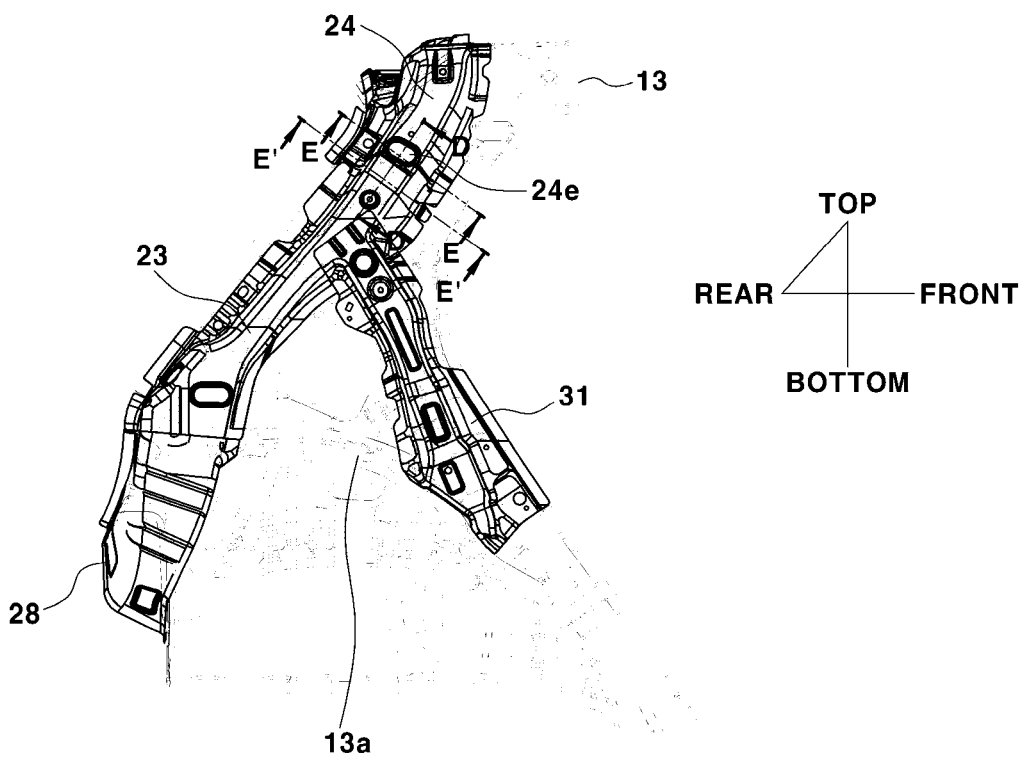
FIG. 8 is a front diagram illustrating the right vehicle body quarter portion according to various exemplary embodiments of the present invention.
Figure 9:
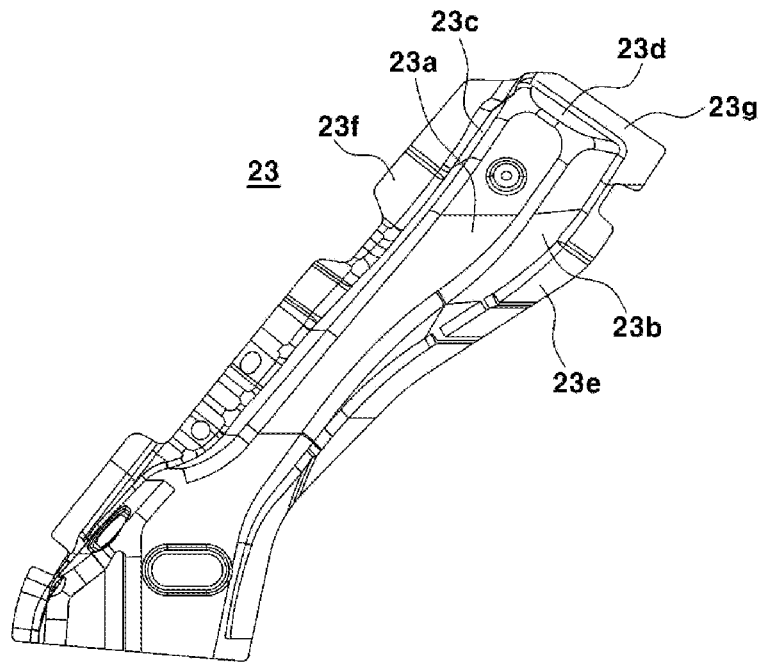
FIG. 9 is a diagram illustrating a right quarter reinforce according to various exemplary embodiments of the present invention.
Figure 10A:
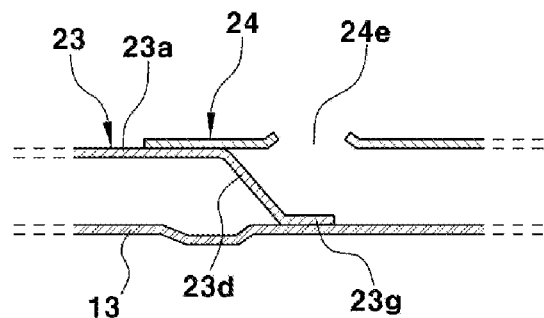
FIG. 10A is a diagram taken along line D-D of FIGS. 1 and 8 that illustrates a connection portion between the right quarter reinforce and the right upper reinforce according to various exemplary embodiments of the present invention.
Figure 10B:
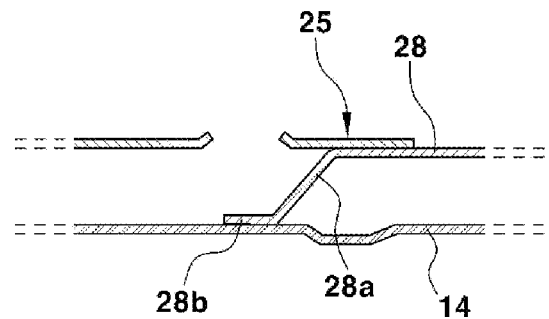
FIG. 10B is a diagram illustrating a connection portion between the left quarter reinforce and the left upper reinforce according to various exemplary embodiments of the present invention.

Furthermore, FIG. 7 is a diagram illustrating a state in which a reinforce is coupled to a right quarter internal panel of the vehicle body rear portion of the present invention that illustrates the right vehicle body quarter portion according to various exemplary embodiments of the present invention. FIG. 8 is a front diagram illustrating the right vehicle body quarter portion according to various exemplary embodiments of the present invention, and FIG. 9 is a diagram illustrating a right quarter reinforce according to various exemplary embodiments of the present invention. Furthermore, FIG. 10A is a diagram taken along line D-D of FIGS. 1 and 8, and FIG. 10B is a diagram illustrating a connection portion between the left quarter reinforce and the left upper reinforce according to various exemplary embodiments of the present invention.

Figure 11:
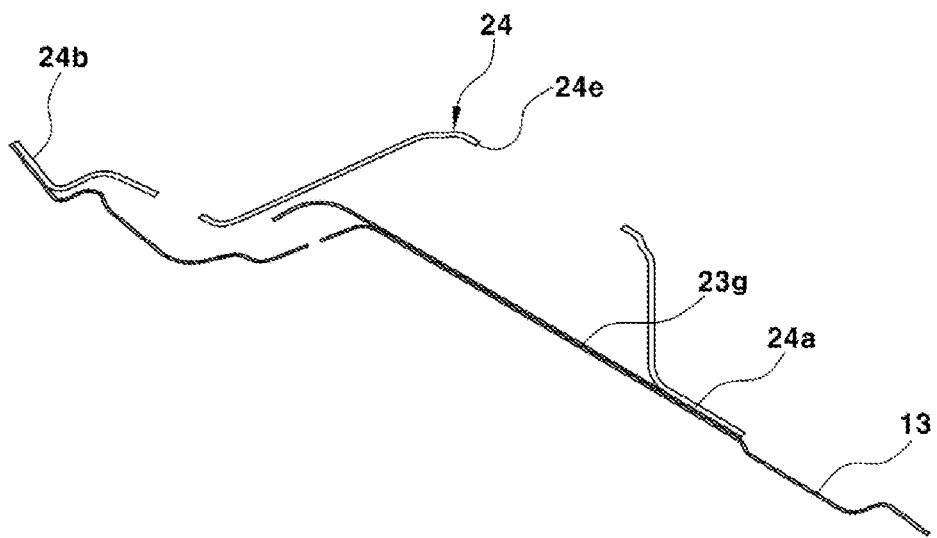
FIG. 11 is a diagram taken along line E-E of FIG. 8.
Figure 12:
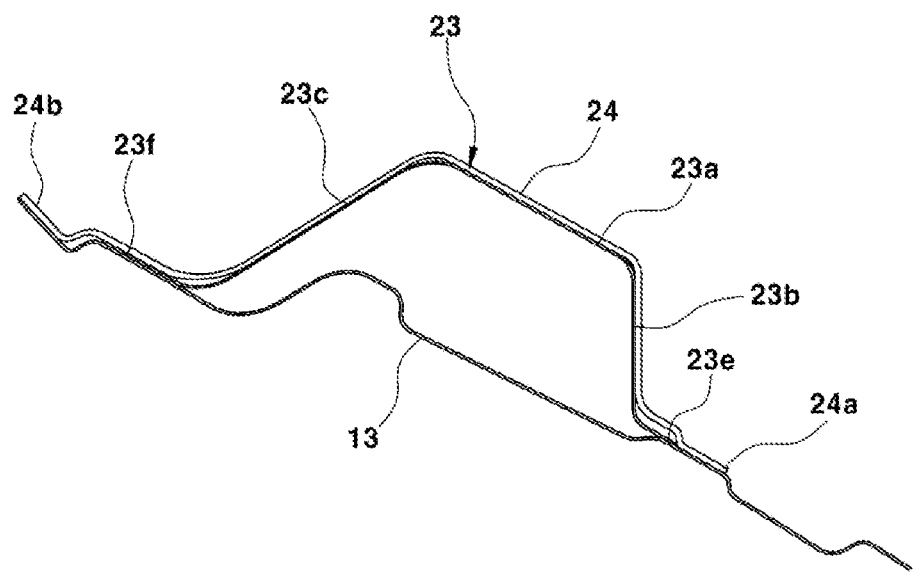
FIG. 12 is a diagram taken along line E'-E' of FIG. 8.
Figure 13:
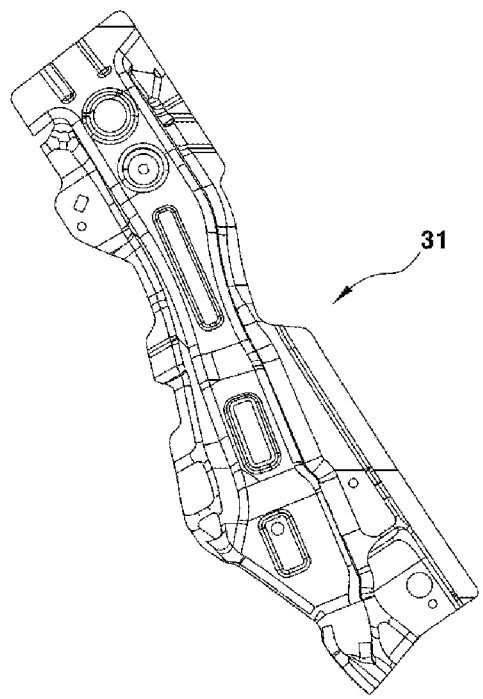
FIG. 13 is a diagram illustrating a right front reinforce according to various exemplary embodiments of the present invention.
Figure 14:
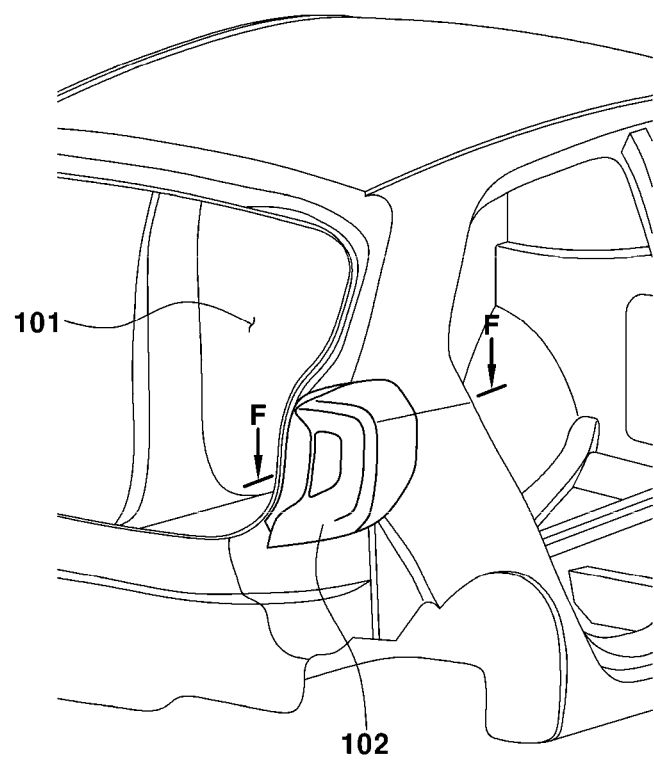
FIG. 14 is a diagram illustrating a vehicle body quarter portion of a conventional tailgate vehicle.
Figure 15:
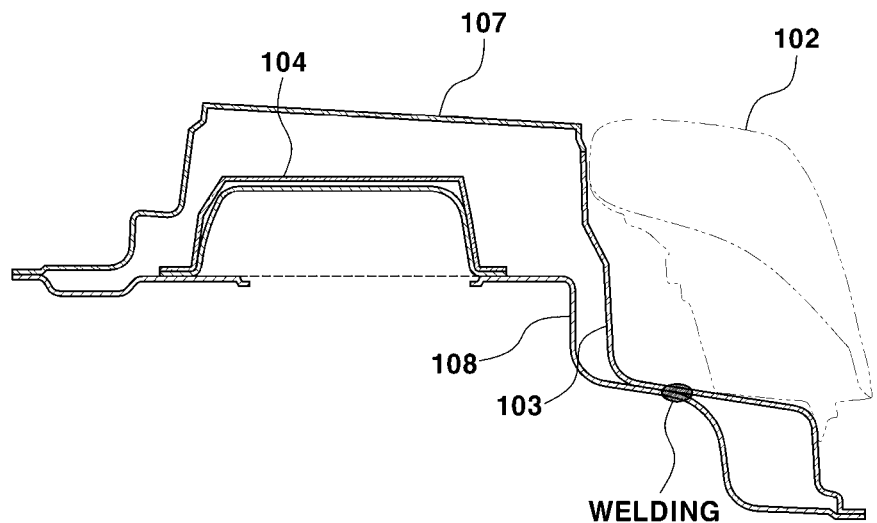
FIG. 15 is a diagram taken along line F-F of FIG. 14.
Figure 16:
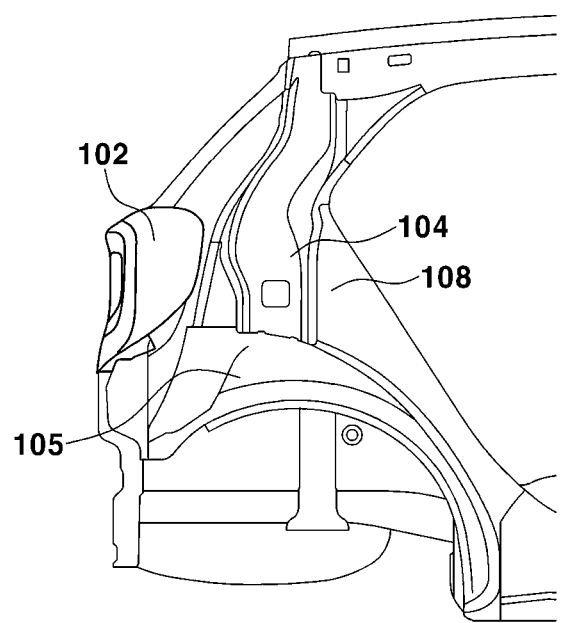
FIG. 16 is a diagram illustrating a quarter reinforce of a vehicle body quarter portion of the conventional tailgate vehicle.
Figure 17:
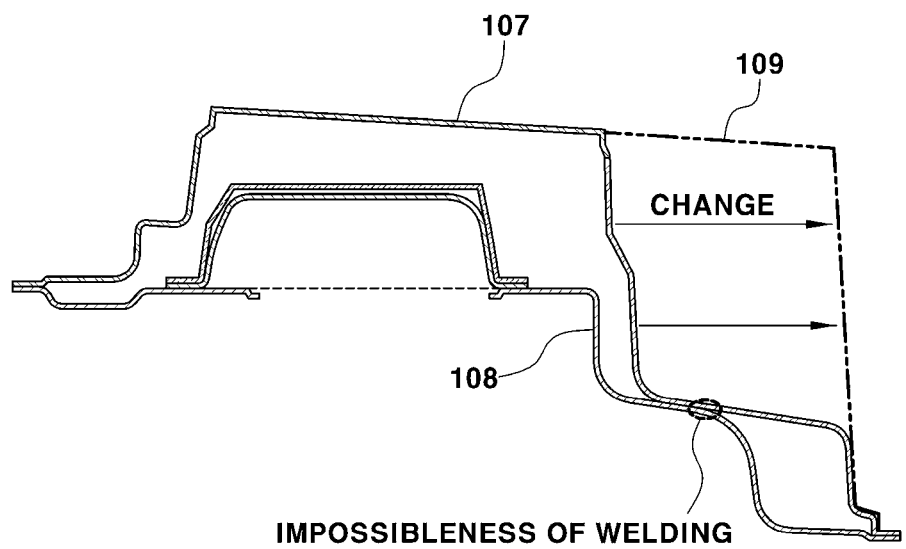
FIG. 17 is a diagram illustrating an extension panel which is applicable by omitting a lamp housing panel from the vehicle body quarter portion of the conventional tailgate vehicle.

FIG. 11 is a diagram taken along line E-E of FIG. 8, FIG. 12 is a diagram taken along line E'-E' of FIG. 8, and FIG. 13 is a diagram illustrating a right front reinforce according to various exemplary embodiments of the present invention.

As shown in FIG. 1, FIG. 2, and FIG. 3, a vehicle body rear portion 1 of a tailgate vehicle includes a vehicle body rear panel 10 having a tailgate opening portion T and a plurality of reinforces 21, 22, 23, 24, 25, 26, 27, and 28 coupled to the vehicle body rear panel 10. The tailgate opening portion T is a portion which is opened or closed by a tailgate of a vehicle.

The vehicle body rear panel 10 may include an upper rear panel 11, a lower rear panel 12, a right quarter internal panel 13, and a left quarter internal panel 14.

The upper rear panel 11 is a portion which is disposed on an upper side of the tailgate opening portion T and surrounds an upper portion of the tailgate opening portion T, and the lower rear panel 12 is a portion which is disposed on a lower side of the tailgate opening portion T and surrounds a lower portion of the tailgate opening portion. The lower rear panel 12 is disposed below the upper rear panel 11 to be spaced from therefrom by a predetermined interval.

In the instant case, the upper rear panel 11 is coupled to an end portion of an upper side of the right quarter internal panel 13 and an end portion of an upper side of the left quarter internal panel 14. The upper rear panel 11 connects the end portion of the upper side of the right quarter internal panel 13 to the end portion of the upper side of the left quarter internal panel 14.

Furthermore, the lower rear panel 12 is coupled to an end portion of a lower side of the right quarter internal panel 13 and an end portion of a lower side of the left quarter internal panel 14. The lower rear panel 12 connects the end portion of the lower side of the right quarter internal panel 13 to the end portion of the lower side of the left quarter internal panel 14.

The right quarter internal panel 13 is disposed on a right side of the upper rear panel 11 and the lower rear panel 12, and the left quarter internal panel 14 is disposed on a left side of the upper rear panel 11 and the lower rear panel 12. That is, the right quarter internal panel 13 and the left quarter internal panel 14 are disposed on the right side and the left side of the tailgate opening portion T, respectively. The right quarter internal panel 13 and the left quarter internal panel 14, together with the upper rear panel 11 and the lower rear panel 12, are disposed on the circumference of the tailgate opening portion T and disposed above a rear wheel of the vehicle.

The right quarter internal panel 13 and the left quarter internal panel 14 may be formed in a similar structure or the same structure. When the right quarter internal panel 13 and the left quarter internal panel 14 are formed in a similar structure, even when there are structural differences, the right quarter internal panel 13 and the left quarter internal panel 14 may provide the same level of functions and effects. Alternatively, when the right quarter internal panel 13 and the left quarter internal panel 14 are formed in the same structure, the right quarter internal panel 13 and the left quarter internal panel 14 may be symmetrical to each other.

The right quarter internal panel 13 and the left quarter internal panel 14, together with the upper rear panel 11 and the lower rear panel 12, are disposed in an annular shape in a circumferential direction of the tailgate opening portion T.

As shown in FIGS. 1 and 3, the plurality of reinforces 21, 22, 23, 24, 25, 26, 27, and 28 may be coupled to the vehicle body rear panel 10 through welding. In the instant case, the plurality of reinforces 21, 22, 23, 24, 25, 26, 27, and 28 are disposed in an annular shape in the circumferential direction of the tailgate opening portion T.

The plurality of reinforces 21, 22, 23, 24, 25, 26, 27, and 28 include a first reinforce 21 coupled to the upper rear panel 11, a second reinforce 22 coupled to the lower rear panel 12, a right quarter reinforce 23 and a right upper reinforce 24 which are coupled to the right quarter internal panel 13, and a left quarter reinforce 28 and a left upper reinforce 25 which are coupled to the left quarter internal panel 14.

Furthermore, according to shapes of the right quarter internal panel 13 and the left quarter reinforce 28, a third right reinforce 26 may be further coupled to the right quarter internal panel 13, and a third left reinforce 27 may be further coupled to the left quarter internal panel 14. The third right reinforce 26 and the third left reinforce 27 may be connected to an end portion of a right side and an end portion of a left side of the second reinforce 22, respectively.

As shown in FIG. 1, FIG. 2, and FIG. 3, the plurality of reinforces 21, 22, 23, 24, 25, 26, 27, and 28 are connected to each other so that end portions of two neighboring reinforces among the plurality of reinforces 21, 22, 23, 24, 25, 26, 27, and 28 are stacked and connected to each other, and an end portion of either of the two neighboring reinforces so connected is provided with a partition wall which extends toward the vehicle body rear panel 10 and is coupled to the vehicle body rear panel 10.

As shown in FIG. 4A, an end portion of a right side of the first reinforce 21 is stacked on and connected to an end portion of an upper side of the right upper reinforce 24. The end portion of the upper side of the right upper reinforce 24 is provided with a partition wall formed to be curved toward the right quarter internal panel 13, that is, a right upper partition wall 24d. The right upper partition wall 24d is formed to be curved on an upper end portion of the right upper reinforce 24, extends toward an external surface of the right quarter internal panel 13, and is bonded and fixed to the right quarter internal panel 13 through an upper top flange 24c.

The left upper reinforce 25 may be bonded to the left quarter internal panel 14 in a structure which is symmetrical to the right upper reinforce 24 and connected to an end portion of a left side of the first reinforce 21.

As shown in FIG. 4B, an end portion of a left side of the first reinforce 21 is stacked on and connected to an end portion of an upper side of the left upper reinforce 25. The end portion of the upper side of the left upper reinforce 25 may be provided with a partition wall formed to be curved toward the left quarter internal panel 14, that is, a left upper partition wall 25a. The left upper partition wall 25a may be formed to be curved on an upper end portion of the left upper reinforce 25, may extend toward an external surface of the left quarter internal panel 14, and may be bonded and fixed to the left quarter internal panel 14 through a flange 25b.

As shown in FIG. 5A, an end portion of a lower side of the right quarter reinforce 23 is stacked on and connected to an end portion of an upper side of the third right reinforce 26. The end portion of the upper side of the third right reinforce 26 is provided with a partition wall formed to be curved toward the right quarter internal panel 13, that is, a third right partition wall 26a. The third right partition wall 26a extends toward the external surface of the right quarter internal panel 13 and is bonded and fixed to the right quarter internal panel 13 through a flange 26b.

The left quarter reinforce 28 may be bonded to the left quarter internal panel 14 in a structure which is symmetrical to the right quarter reinforce 23 and connected to the third left reinforce 27.

As shown in FIG. 5B, an end portion of a lower side of the left quarter reinforce 28 is stacked on and connected to an end portion of an upper side of the third left reinforce 27. The end portion of the upper side of the third left reinforce 27 may be provided with a partition wall formed to be curved toward the left quarter internal panel 14, that is, a third left partition wall 27a. The third left partition wall 27a extends toward the external surface of the left quarter internal panel 14 and is bonded and fixed to the left quarter internal panel 14 through a flange 27b.

As shown in FIG. 6A, an end portion of a lower side of the third right reinforce 26 is stacked on and connected to an end portion of a right side of the second reinforce 22. The end portion of the right side of the second reinforce 22 is provided with a partition wall formed to be curved toward the lower rear panel 12, that is, a right lower partition wall 22a. The right lower partition wall 22a extends toward an external surface of the lower rear panel 12 and is bonded and fixed to the external surface of the lower rear panel 12 through a flange 22c.

The third left reinforce 27 may be bonded to the left quarter internal panel 14 in a structure which is symmetrical to the third right reinforce 26 and connected to the end portion of the right side of the second reinforce 22.

As shown in FIG. 6B, an end portion of a lower side of the third left reinforce 27 is stacked on and connected to the end portion of the left side of the second reinforce 22. The end portion of the left side of the second reinforce 22 is provided with a partition wall formed to be curved toward the lower rear panel 12, that is, a left lower partition wall 22b. The left lower partition wall 22b may extend toward the external surface of the lower rear panel 12 and may be bonded and fixed to the external surface of the lower rear panel 12 through a flange 22d.

Here, a connection structure between the right quarter reinforce 23 and the right upper reinforce 24 will be further described below with reference to FIGS. 7 to 12.

The left quarter reinforce 28 may be configured to be symmetrical to the right quarter reinforce 23, which will be described below, based on the first reinforce 21 and the second reinforce 22.

As shown in FIGS. 7 and 8, to secure rigidity, the right quarter reinforce 23 and the right upper reinforce 24 are bonded to the right quarter internal panel 13. The right quarter reinforce 23 and the right upper reinforce 24 may be coupled to the right quarter internal panel 13 through welding.

The right quarter reinforce 23 is bonded to the external surface of the right quarter internal panel 13 of an internal surface of the right quarter internal panel 13 facing a vehicle interior and the external surface thereof facing a vehicle external.

In the instant case, the right quarter reinforce 23 is disposed in a rear portion of the right quarter internal panel 13 to be adjacent to the tailgate opening portion. The right quarter reinforce 23 is disposed to be immediately adjacent to the tailgate opening portion T.

As shown in FIG. 9, the right quarter reinforce 23 may include a base wall 23a, a front wall 23b, a rear wall 23c, and a quarter partition wall 23d.

As shown in FIG. 10A, the base wall 23a is disposed at a predetermined height from the external surface of the right quarter internal panel 13. That is, the base wall 23a is spaced from the external surface of the right quarter internal panel 13 in a left and right direction of the vehicle. In the instant case, an external surface of an end portion of an upper side of the base wall 23a is in contact with an internal surface of an end portion of a lower side of the right upper reinforce 24. The base wall 23a may be formed of a flat plate.

As shown in FIG. 11 and FIG. 12, the front wall 23b is formed to be curved on a front end portion of the base wall 23a to face the external surface of the right quarter internal panel 13, the rear wall 23c is formed to be curved on a rear end portion of the base wall 23a to face the external surface of the right quarter internal panel 13, and the quarter partition wall 23d is formed to be curved on an upper end portion of the base wall 23a to face the external surface of the right quarter internal panel 13.

In the instant case, the quarter partition wall 23d is formed to connect an upper end portion of the front wall 23b to an upper end portion of the rear wall 23c. That is, the quarter partition wall 23d is integrally formed with the upper end portion of the front wall 23b and the upper end portion of the rear wall 23c. The quarter partition wall 23d is formed to be curved rearward from the upper end portion of the front wall 23b to a lower end portion thereof and formed to be curved forward on the upper end portion of the rear wall 23c.

The quarter partition wall 23d is formed to extend to the right quarter internal panel 13 from the end portion of the lower side of the right upper reinforce 24 which is stacked on an external surface of an upper end portion of the right quarter reinforce 23. The quarter partition wall 23d is disposed from an internal surface of the end portion of the lower side of the right upper reinforce 24 to the external surface of the right quarter internal panel 13. In the instant case, the quarter partition wall 23d is formed to extend on the upper end portion of the base wall 23a in the left and right direction of the vehicle.

The quarter partition wall 23d is a partition wall of the right quarter reinforce 23 and is configured to divide a space, which is surrounded by the right quarter internal panel 13, the right quarter reinforce 23, and the right upper reinforce 24, into an upper space and a lower space so that rigidity of the vehicle body rear portion 1 including a right vehicle body quarter portion QR may be increased.

The right vehicle body quarter portion QR includes the right quarter internal panel 13 and the right quarter reinforce 23 and the right upper reinforce 24 which are coupled to the right quarter internal panel 13. The right vehicle body quarter portion QR may further include a right front reinforce 31.

In the instant case, to more efficiently increase rigidity of the right vehicle body quarter portion QR, the quarter partition wall 23d may be disposed to be inclined with respect to the right quarter internal panel 13. The quarter partition wall 23d may be disposed to be inclined at a predetermined angle with respect to the right quarter internal panel 13 based on a section of the right quarter internal panel 13 to which the quarter partition wall 23d is bonded.

Furthermore, the right quarter reinforce 23 may include a quarter front flange 23e, a quarter rear flange 23f, and a quarter upper flange 23g which are coupled to the right quarter internal panel 13 through welding.

The quarter front flange 23e is formed to extend from a final end portion of the front wall 23b, the quarter rear flange 23f is formed to extend from a final end portion of the rear wall 23c, and the quarter upper flange 23g is formed to extend from a final end portion of the quarter partition wall 23d.

In the instant case, to allow the quarter front flange 23e, the quarter rear flange 23f, and the quarter upper flange 23g to be bonded to the right quarter internal panel 13, the quarter front flange 23e is formed to be curved on the final end portion of the front wall 23b, the quarter rear flange 23f is formed to be curved on the final end portion of the rear wall 23c, and the quarter upper flange 23g is formed to be curved on the final end portion of the quarter partition wall 23d.

The right quarter reinforce 23 configured as described above may be tack-welded to the right quarter internal panel 13 to fix a position of the right quarter reinforce 23 and then may be completely welded and coupled to the right quarter internal panel 13 together with the right upper reinforce 24. In the instant case, to fix the position of the right quarter reinforce 23, the quarter upper flange 23g is tack-welded to the right quarter internal panel 13.

In a state in which the quarter upper flange 23g is tack-welded to the right quarter internal panel 13, the right upper reinforce 24 is disposed on the external surface of the right quarter reinforce 23 to stack the end portion of the lower side of the right upper reinforce 24 on the external surface of the end portion of the upper side of the right quarter internal panel 13, and then the flanges 25b and 26b of the right quarter reinforce 23 and the flanges 24a, 24b, and 24c of the right upper reinforce 24 are coupled to the right quarter internal panel 13 through welding. In the instant case, the quarter front flange 23e and the quarter rear flange 23f are welded to the right quarter internal panel 13 first together with the flanges 24a, 24b, and 24c of the right upper reinforce 24, and then the quarter upper flange 23g is welded to the right quarter internal panel 13.

To weld the quarter upper flange 23g, a passing hole 24e is formed at a lower portion of the right upper reinforce 24 to allow the quarter upper flange 23g to be bonded to the right quarter internal panel 13 by passing through the right upper reinforce 24.

In a state of being stacked on and overlapping the end portion of the upper side of the right quarter reinforce 23, the end portion of the lower side of the right upper reinforce 24 is bonded to the right quarter internal panel 13. That is, the end portion of the upper side of the right quarter reinforce 23 and the end portion of the lower side of the right upper reinforce 24 may be connected to each other in a stacked form. In the instant case, the end portion of the lower side of the right upper reinforce 24 may be formed to have a cross-sectional structure of a ⊏ shape matching the end portion of the upper side of the right quarter reinforce 23.

The right upper reinforce 24 is disposed above the right quarter reinforce 23 and bonded to the external surface of the right quarter internal panel 13, and the end portion of the lower side of the right upper reinforce 24 may be stacked on an external side of the end portion of the upper side of the right quarter reinforce 23.

In the instant case, the end portion of the lower side of the right upper reinforce 24 may be bonded to the right quarter internal panel 13 and bonded to the quarter front flange 23e of the right quarter reinforce 23. More An end portion of a lower side of an upper front flange 24a may be bonded to the quarter front flange 23e through welding, and an end portion of a lower side of an upper rear flange 24b may be bonded to the right quarter internal panel 13 through welding.

The right upper reinforce 24 includes the upper front flange 24a, the upper rear flange 24b, and an upper top flange 24c. The upper front flange 24a is formed to be curved and extends from a front end portion of the right upper reinforce 24, the upper rear flange 24b is formed to be curved and extends from a rear end portion of the right upper reinforce 24, and the upper top flange 24c is formed to be curved and extends from the upper end portion of the right upper reinforce 24.

Referring to FIGS. 7, 11, and 12, the upper front flange 24a is bonded to the external surface of the right quarter internal panel 13. In the instant case, the end portion of the lower side of the upper front flange 24a may be partially stacked on and bonded to the quarter front flange 23e. The upper rear flange 24b and the upper top flange 24c are bonded to the external surface of the right quarter internal panel 13.

In the instant case, the right upper reinforce 24 may be disposed to be adjacent to the tailgate opening portion T above the right quarter reinforce 23. The right upper reinforce 24 may be disposed in the circumferential direction of the tailgate opening portion T together with the right quarter reinforce 23 and may be disposed at a corner of an upper side of the tailgate opening portion T.

Furthermore, a left vehicle body quarter portion QL of the vehicle body rear portion 1 may be configured to be bilaterally symmetrical with respect to the right vehicle body quarter portion QR based on the first reinforce 21 and the second reinforce 22. The left vehicle body quarter portion QL includes the left quarter internal panel 14 and the left quarter reinforce 28 and the left upper reinforce 25 which are coupled to the left quarter internal panel 14. The left vehicle body quarter portion QL may further include a left front reinforce.

The left quarter reinforce 28 may be formed in a structure which is bilaterally symmetrical with respect to the right quarter reinforce 23, coupled to the left quarter internal panel 14 in the structure which is bilaterally symmetrical with respect to the right quarter reinforce 23, and connected to the left upper reinforce 25 and the third left reinforce 27 in the structure which is bilaterally symmetrical with respect to the right quarter reinforce 23.

The end portion of the upper side of the left quarter reinforce 28 and the end portion of the lower side of the left upper reinforce 25 may be connected to each other in a stacked form. The left quarter reinforce 28 may be disposed below the left upper reinforce 25, and the end portion of the lower side of the left upper reinforce 25 may be coupled to the left quarter internal panel 14 in a form of being disposed on an external side of the end portion of the upper side of the left quarter reinforce 28.

The end portion of the upper side of the left quarter reinforce 28 may be provided with a partition wall formed to be curved toward the left quarter internal panel 14, that is, a left quarter partition wall 28a. The left quarter partition wall 28a may be formed to be bilaterally symmetrical with respect to the quarter partition wall 23d of the right quarter reinforce 23.

Furthermore, the left front reinforce may be formed to be bilaterally symmetrical with respect to the right front reinforce 31 and may be coupled to the left quarter internal panel 14 to be bilaterally symmetrical with respect to the right front reinforce 31.

As described above, due to an annular connection structure of the reinforces 21, 22, 23, 24, 25, 26, 27, and 28 coupled to the vehicle body rear panel 10 and a structure of the partition walls, rigidity of the vehicle body rear portion 1 may be increased.

Furthermore, in the rear portion 1 of the vehicle body of the tailgate vehicle, a relatively large amount of torsional deformation occurs in sections adjacent to upper and lower portions and corners of the tailgate opening portion. The partition walls of the reinforces are disposed in such sections (i.e., the sections adjacent to the upper and lower portions and the corners of the tailgate opening portion) so that rigidity of portions vulnerable to torsional deformation in the vehicle body rear portion 1 may be effectively reinforced.

Meanwhile, the above-mentioned passing hole 24e may be provided on the lower side of the right upper reinforce 24. The passing hole 24e is to be used when the quarter upper flange 23g is bonded to the right quarter internal panel 13 through welding, and the passing hole 24e is formed in the right upper reinforce 24 to allow a nozzle of a welding gun to pass through the passing hole 24e.

The passing hole 24e may be disposed collinear with the quarter upper flange 23g based on the left and right direction of the vehicle, and the quarter upper flange 23g of the right quarter reinforce 23 may be completely welded to the right quarter internal panel 13 through the welding gun passing through the passing hole 24e.

Since the passing hole 24e is formed in the right upper reinforce 24, the quarter upper flange 23g may be welded to the right quarter internal panel 13 in a state in which the right upper reinforce 24 is disposed to be stacked on the right quarter internal panel 13 and the right quarter reinforce 23.

Furthermore, as shown in FIGS. 8 and 13, the right front reinforce 31, which is formed to have a substantially ⊏-shaped cross-sectional structure, may be further coupled to the right quarter internal panel 13 to increase rigidity.

The right front reinforce 31 may be bonded to the external surface of the right quarter internal panel 13 through welding. In the instant case, an end portion of an upper side of the right front reinforce 31, which is stacked on a center portion of the right quarter reinforce 23, may be bonded to the center portion thereof. A portion excluding the end portion of the upper side of the right front reinforce 31, that is, a lower portion of the right front reinforce 31 extends downward to a front side of the right quarter reinforce 23 to be bonded to the external surface of the right quarter internal panel 13.

The end portion of the upper side of the right front reinforce 31 is disposed below the right upper reinforce 24, and an end portion of a lower side of the right front reinforce 31 is spaced a predetermined interval from a lower portion of the right quarter reinforce 23 in the front-rear direction of the vehicle.

Thus, the right front reinforce 31 and the right quarter reinforce 23 are disposed in a substantially ⋏-shape. In the instant case, the end portion of the lower side of the right front reinforce 31 may be spaced a predetermined interval from the end portion of the lower side of the right quarter reinforce 23.

The right front reinforce 31 is disposed diagonally toward a front side of the wheel housing panel 13a from the center portion of the right quarter reinforce 23, and the right quarter reinforce 23 is disposed diagonally on the upper portion of the right quarter internal panel 13 toward a rear side of the wheel housing panel 13a.

The lower portion of the right front reinforce 31 may be disposed to extend to the front side of the wheel housing panel 13a provided on the lower portion of the right quarter internal panel 13. In the instant case, a lower portion of the right quarter reinforce 23 may be formed to extend to a rear upper side of the wheel housing panel 13a.

Furthermore, in the instant case, a front position of the wheel housing panel 13a disposed on a lower end portion of the right front reinforce 31 may be a position at which a striker of a vehicle rear door is mounted.

As described above, since the right front reinforce 31 is coupled to the right quarter internal panel 13, rigidity and a side collision performance of the vehicle body rear portion 1, which may be relatively insufficient due to the arrangement of the right quarter reinforce 23 on the rear portion of the right quarter internal panel 13, may be further improved. When the right quarter reinforce 23 is disposed in the rear portion of the right quarter internal panel 13, the rigidity of the vehicle body rear portion 1 may be reduced compared to a case in which the right quarter reinforce 23 is disposed in the center portion of the right quarter internal panel 13.

Furthermore, the right front reinforce 31 may be bonded to the right quarter reinforce 23 and the right quarter internal panel 13 through the flanges formed at each of a front end portion, a rear end portion, and an upper end portion of the right front reinforce 31.

In accordance with various aspects of the present invention, due to an annular connection structure of reinforces coupled to a vehicle body rear panel and a structure of partition walls, rigidity of a vehicle body rear portion may be increased, and the partition walls of the reinforces are disposed in sections of the vehicle body rear portion adjacent to upper and lower portions and corners of the tailgate opening portion so that rigidity of portions vulnerable to torsion deformation in the vehicle body rear portion may be reinforced more effectively.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle body rear portion comprising:
    a vehicle body rear panel provided with a tailgate opening portion; and
    a plurality of reinforces coupled to the vehicle body rear panel and disposed in an annular shape in a circumferential direction of the tailgate opening portion,
    wherein the plurality of reinforces is connected to each other so that end portions of two neighboring reinforces among the plurality of reinforces is stacked and connected to each other, and an end portion of either of the two neighboring reinforces so connected is provided with a partition wall which extends toward the vehicle body rear panel and is coupled to the vehicle body rear panel.

2. The vehicle body rear portion of claim 1,
    wherein the vehicle body rear panel includes a right quarter internal panel disposed on a right side of the tailgate opening portion;
    wherein each of the plurality of reinforces includes a right quarter reinforce and a right upper reinforce which are coupled to the right quarter internal panel; and
    wherein an end portion of the right quarter reinforce and an end portion of the right upper reinforce are stacked and connected to each other.

3. The vehicle body rear portion of claim 2, wherein an end portion of a lower side of the right upper reinforce is bonded to the right quarter internal panel in a state of being disposed on an external side of an end portion of an upper side of the right quarter reinforce.

4. The vehicle body rear portion of claim 2, wherein the right quarter reinforce includes:
   a base wall spaced from the right quarter internal panel;
   a front wall formed to be curved on a front end portion of the base wall to face the right quarter internal panel;
   a rear wall formed to be curved on a rear end portion of the base wall to face the right quarter internal panel; and
   a quarter partition wall formed to be curved on an upper end portion of the base wall to face the right quarter internal panel.

5. The vehicle body rear portion of claim 4, wherein an end portion of an upper side of the base wall is in contact with an internal surface of the end portion of the lower side of the right upper reinforce.

6. The vehicle body rear portion of claim 5, wherein the quarter partition wall is disposed from an internal surface of the right upper reinforce to an external surface of the right quarter internal panel.

7. The vehicle body rear portion of claim 6, wherein the right quarter reinforce includes:
   a quarter front flange formed to extend from an end portion of the front wall and bonded to the right quarter internal panel;
   a quarter rear flange formed to extend from an end portion of the rear wall and bonded to the right quarter internal panel; and
   a quarter upper flange formed to extend from an end portion of the quarter partition wall and bonded to the right quarter internal panel.

8. The vehicle body rear portion of claim 2, wherein a right front reinforce is further bonded to the right quarter internal panel, and an end portion of an upper side of the right front reinforce is stacked on and bonded to the right quarter reinforce.

9. The vehicle body rear portion of claim 8, wherein the right front reinforce extends downward to a front side of the right quarter reinforce, and an end portion of a lower side of the right front reinforce is spaced a predetermined interval from an end portion of a lower side of the right quarter reinforce in a front and rear direction.

10. The vehicle body rear portion of claim 8, wherein an end portion of a lower side of the right front reinforce is disposed to extend to a front side of a wheel housing panel provided in a lower portion of the right quarter internal panel.

11. The vehicle body rear portion of claim 7, wherein a passing hole passing through a portion of the right upper reinforce to allow the quarter upper flange to be bonded to the right quarter internal panel through the passing hole is formed in the right upper reinforce.

12. The vehicle body rear portion of claim 2,
   wherein the vehicle body rear panel includes a left quarter internal panel disposed on a left side of the tailgate opening portion,
   wherein each of the plurality of reinforces includes a left quarter reinforce and a left upper reinforce which are coupled to the left quarter internal panel, and
   wherein an end portion of the left quarter reinforce and an end portion of the left upper reinforce are stacked and connected to each other.

13. The vehicle body rear portion of claim 12, wherein the vehicle body rear panel includes:
   an upper rear panel surrounding an upper portion of the tailgate opening portion and connecting an end portion of an upper side of the right quarter internal panel to an end portion of an upper side of the left quarter internal panel; and
   a lower rear panel surrounding a lower portion of the tailgate opening portion and connecting an end portion of a lower side of the right quarter internal panel to an end portion of a lower side of the left quarter internal panel; and
   each of the plurality of reinforces includes:
   a first reinforce coupled to the upper rear panel; and
   a second reinforce coupled to the lower rear panel.

14. The vehicle body rear portion of claim 13, wherein the left quarter reinforce is bilaterally symmetrical with respect to the right quarter reinforce based on the first reinforce and the second reinforce.

15. The vehicle body rear portion of claim 13,
   wherein a left vehicle body quarter portion is bilaterally symmetrical with respect to a right vehicle body quarter portion based on the first reinforce and the second reinforce,
   wherein the right vehicle body quarter portion includes the right quarter internal panel, and the right quarter reinforce and the right upper reinforce which are coupled to the right quarter internal panel, and
   wherein the left vehicle body quarter portion includes the left quarter internal panel, and the left quarter reinforce and the left upper reinforce which are coupled to the left quarter internal panel.

16. The vehicle body rear portion of claim 13, wherein an end portion of a right side of the first reinforce is stacked and connected to an end portion of an upper side of the right upper reinforce, and an end portion of a left side of the first reinforce is stacked and connected to an end portion of an upper side of the left upper reinforce.

17. The vehicle body rear portion of claim 13,
   wherein an end portion of a right side of the second reinforce is stacked and connected to an end portion of a lower side of a third right reinforce, and an end portion of a left side of the second reinforce is stacked and connected to an end portion of a lower side of a third left reinforce; and
   wherein an end portion of an upper side of the third right reinforce is stacked and connected to the end portion of the lower side of the right quarter reinforce, and an end portion of an upper side of the third left reinforce is stacked and connected to an end portion of a lower side of the left quarter reinforce.

* * * * *